(12) United States Patent
Aubert et al.

(10) Patent No.: US 8,239,075 B2
(45) Date of Patent: Aug. 7, 2012

(54) DETECTION OF ERRORS IN DATA RELATING TO THE ACTUATION OF A VEHICLE MEMBER

(75) Inventors: Jean-Jacques Aubert, Pibrac (FR); Patrice Brot, Toulouse (FR); Agnan De Bonneval, Labege (FR); Yves Crouzet, Ramonville Saint Agne (FR); Anis Youssef, Montigny-le-Bretonneux (FR)

(73) Assignees: Airbus Operations SAS, Toulouse (FR); Centre National de la Recherche Scientifique (CNRS), Paris (FR)

( * ) Notice: Subject to any disclaimer, the term of this patent is extended or adjusted under 35 U.S.C. 154(b) by 814 days.

(21) Appl. No.: 11/719,325

(22) PCT Filed: Oct. 21, 2005

(86) PCT No.: PCT/FR2005/002624
§ 371 (c)(1),
(2), (4) Date: May 11, 2009

(87) PCT Pub. No.: WO2006/053956
PCT Pub. Date: May 26, 2006

(65) Prior Publication Data
US 2009/0319122 A1 Dec. 24, 2009

(30) Foreign Application Priority Data
Nov. 16, 2004 (FR) ...................................... 04 12141

(51) Int. Cl.
*H04L 1/08* (2006.01)

(52) U.S. Cl. ............ 701/1; 701/3; 714/776; 375/240.24
(58) Field of Classification Search .................. None
See application file for complete search history.

(56) References Cited

U.S. PATENT DOCUMENTS

| | | | |
|---|---|---|---|
| 4,670,880 A | 6/1987 | Jitsukawa et al. | |
| 6,014,411 A | 1/2000 | Wang | |
| 6,292,918 B1 * | 9/2001 | Sindhushayana et al. | 714/755 |
| 6,560,744 B1 | 5/2003 | Burshtein | |
| 6,690,733 B1 | 2/2004 | Baumgartner et al. | |
| 7,016,770 B2 * | 3/2006 | Pfaffeneder | 701/1 |
| 2003/0033036 A1 * | 2/2003 | Wendorff | 700/79 |
| 2004/0042555 A1 * | 3/2004 | Kawada et al. | 375/257 |
| 2004/0225940 A1 * | 11/2004 | Kerr et al. | 714/752 |

FOREIGN PATENT DOCUMENTS
EP 0 831 614 3/1998
* cited by examiner

*Primary Examiner* — Michael J. Zanelli
(74) *Attorney, Agent, or Firm* — Oblon, Spivak, McClelland, Maier & Neustadt, L.L.P.

(57) ABSTRACT

The invention relates to a method for the transmission of data relating to the actuation of a member used to operate a vehicle, in which code words are transmitted along the length of a given channel, each of said code words resulting from the channel coding of a block of information symbols that is representative of the aforementioned data. According to the invention, at least two such successive blocks of information symbols are coded using two different codes. The invention also relates to a data transmission system that is used to implement said method.

13 Claims, 1 Drawing Sheet

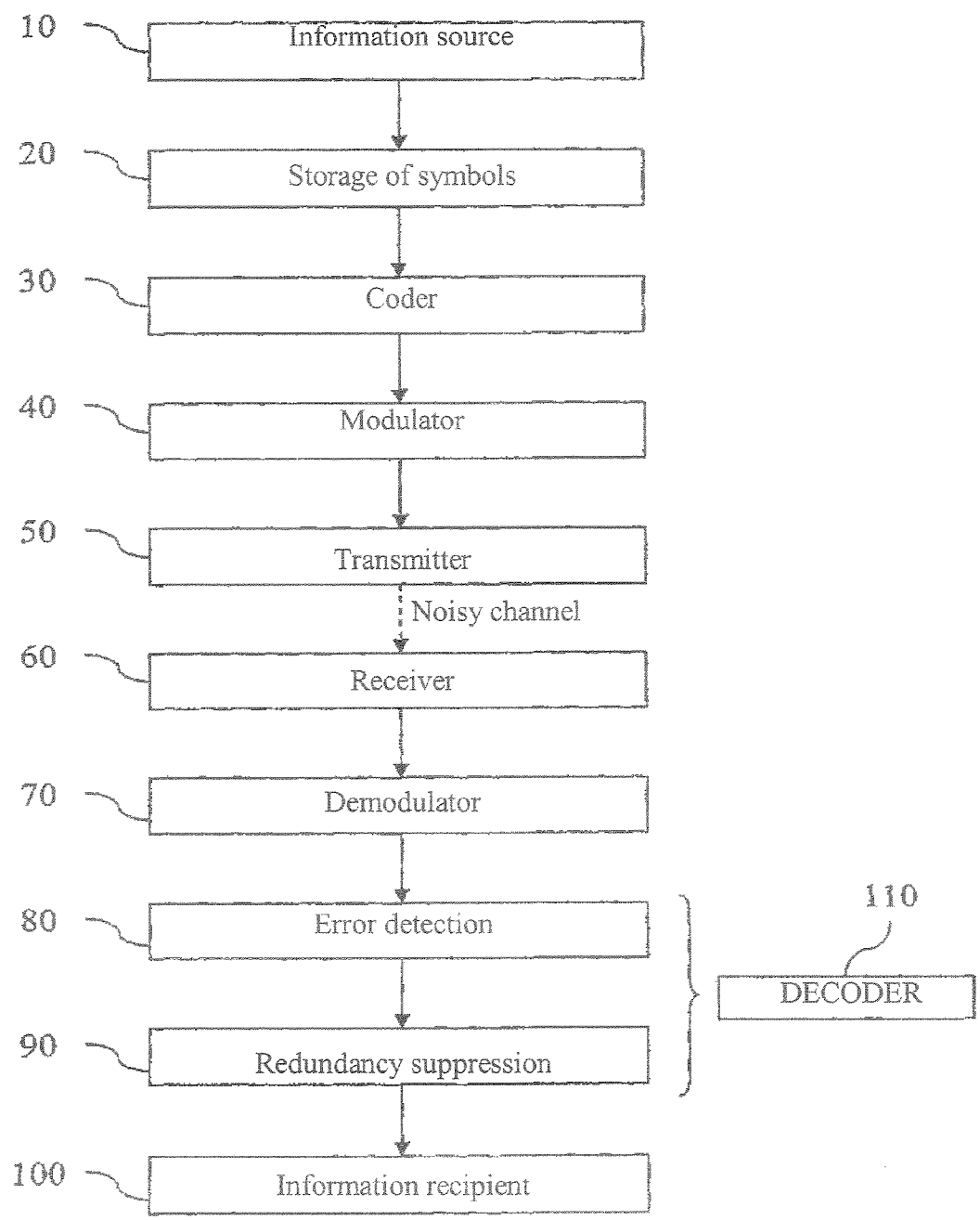

DETECTION OF ERRORS IN DATA RELATING TO THE ACTUATION OF A VEHICLE MEMBER

BACKGROUND OF THE INVENTION

The present invention relates to systems for transmission, by means of digital signals, of data concerning the actuation of a member used for operation of a vehicle. It relates in particular to the problem of fidelity of transmission of such data in on-board systems operating in real time.

This problem occurs, for example, in the field of control of vehicles such as an automobile or airplane. In such vehicles, the actuation of a certain number of electromechanical members is "assisted", in the sense that the vehicle operator controls the operation of these members by sending an electrical signal to a servo unit responsible for actuating these members by means of assistance mechanisms such as hydraulic systems or electromagnets, in conformity with the said electrical control signal.

The first electrical controls of these type were formed by analog signals, but digital signals are being increasingly used to support control orders. In this case, the actions exerted by the vehicle operator are converted to the form of digital controls, which are then inserted in messages by an insertion unit; then these messages pass through one or more interconnection units until they reach one or more extraction units, in which the said digital controls are extracted from the said message; finally, the control orders are applied to one or more servo units (if necessary after they have been converted to analog signals for the servo units that need them).

These controls often concern vehicle members that must operate properly to ensure passenger safety. It is therefore very important to be sure that the messages are transmitted reliably between the insertion unit and each extraction unit. However, that poses a problem to the extent that various factors may affect the reliability of such transmission. These factors comprise in particular electronic noise (which may result from external electromagnetic perturbations or from fluctuations intrinsic to the electrical components used to transport the digital signals) and physical failure of one of these electrical components.

The problem considered hereinabove also occurs as regards the digital data representative of a physical measurement made by a sensor, when such measurement is taken into account by a servo unit in order to actuate a vehicle member. The same is true when a servo unit responsible for actuating a vehicle member must take into account digital information sent by a database or a processor.

Since transmission errors are inevitable in practice, the question that occurs is that of knowing how they can be taken into account in an on-board communication system operating in real time in such a way as to minimize the impact that such transmission errors may have on proper operation of the vehicle.

A known solution to this problem (for example, see the book edited by D. Powell entitled "*A Generic Fault-Tolerant Architecture for Real-Time Dependable Systems*", Kluwer Academic Publishers, ISBN 0-7923-7295-6, Boston 2001, pages 46 to 50; or ISO Standard 11898-1, known under the name of "Controller Area Network") comprises applying channel coding to the messages before they are transmitted and recovering these messages by decoding the received code words.

It is recalled that "channel coding" (the discussion here will be limited to "block" coding) comprises transmitting, to a receiver, "code words" formed by introducing a certain redundancy in the data to be transmitted. More precisely, by means of a code word there is transmitted the Information initially contained in a predetermined number k of symbols, known as "information symbols", sampled in an "alphabet" of finite size q; from these k information symbols there is calculated a number n>k of symbols belonging to that alphabet and constituting the components of code words $v=(v_1, v_2, \ldots, v_n)$. The set of code words obtained when each information symbol takes any value whatsoever in the alphabet comprises a kind of dictionary referred to as "code" of "dimension" k and "length" n.

In particular, when the size q of the alphabet is taken equal to a power of a prime number, this alphabet can be given a finite body structure known as "Galois body" ("Galois field" in English), denoted GF(q). For example, for q=2, GF(q) is a binary alphabet, and for $q=2^8=256$, GF(q) is an alphabet of octets ("bytes" in English).

A transmission error exists when a received word r differs from the corresponding code word v sent by the transmitter. It is said that transmission errors are caused by the "channel noise".

After reception of the word r, the receiver first attempts to detect the possible presence of a transmission error. The codes that make it possible to detect that errors have occurred are known as "error detector codes". It is these codes in which the present invention is primarily interested, although it would also be possible to envision correcting the transmission errors by resorting to "error corrector" codes. It will also be noted that certain codes also make it entirely possible both to detect the presence of errors and to correct them.

Regardless of the type of code used, it must be seen that the capacity of the code to detect or correct transmission errors is always limited. In general, the capacity for detection or correction of a code increases, for fixed k, with the "redundancy" (n−k). In particular, the probability of non-detection corresponds to the probability that a received word r, even though erroneous, is accidentally equal to a code word other than the transmitted word that is at the origin of this received word r; from this it is deduced that this probability is on the order of $q^{-(n-k)}$. Consequently, a predetermined error detection reliability in a digital communication system is traditionally achieved by adjusting the parameters q, n and k of an error detection code to conform to this order of magnitude.

However, the foregoing estimate of the probability of non-detection starts from the hypothesis that random errors are involved. As it happens, this hypothesis is invalidated in certain specific applications.

For example, let us return to the problem of making digital controls safe in a vehicle: let us therefore suppose, as explained hereinabove, that these controls are inserted in messages composed of Information symbols belonging to a certain alphabet, and let us suppose that these messages are provided with a certain channel coding. It will then be possible to consider that certain errors, such as those caused by electromagnetic fluctuations, are effectively of random nature and of short duration: in this case, it will be possible to consider reliably that the frequency at which such errors are not detected (in the coded message, and consequently in the decoded message) is equal to the product of the mean frequency of these fluctuations by the probability $q^{-(n-k)}$ of non-detection mentioned hereinabove.

On the other hand, let us suppose, again for the example of digital controls of a vehicle, that an electric component along the "transmission channel" definitively develops a fault, and that this fault unfortunately, additionally causes a non-detected error in a message. The rate of occurrence of such an event is always equal to the product of the rate of failure of such an electrical component by the probability $q^{-(n-k)}$ of non-detection. However, it is seen that, in this situation, if the operator then sends a second order identical to the first (which may be the case when the operator attempts to activate a certain electromechanical member in conformity with proper operation of the vehicle), then the new order will be affected by the same error as the preceding, and this new error again will be non-detected. The consequences that such a situation could provoke can be easily imagined.

A first known means for reducing the risk that such an event will occur is to double the electrical circuits in such a way that two copies of each message can be transmitted along two separate channels respectively. Under these conditions, it is known that an error is produced if, after decoding of the corresponding words along these two channels, it is found that the resulting two messages are not identical. This technical solution obviously has the disadvantage of doubling the installation costs of these electrical circuits. In addition it involves an increase not only in the space occupied by these circuits but also in the weight thereof, which may be very inconvenient in certain fields such as aviation.

SUMMARY OF THE INVENTION

Another known means for reducing this risk consists in acting at the coding level by increasing the redundancy (and therefore the code length) relative to the number of information symbols (the "useful load"). However, this technical solution has the disadvantage of reducing the "coding efficiency" k/n, or in other words of increasing the processing time and the resulting cost of coding.

According to a first aspect, therefore, the invention relates to a method for data transmission concerning the actuation of a vehicle member, wherein there are transmitted, along a given channel, code words that each result from channel coding of an information symbol block representative of the said data, the said method being noteworthy in that at least two such successive information symbol blocks are coded by means of two mutually different codes.

In effect, the authors of the present invention realized that, in numerous applications, the fact that an information symbol sequence occasionally undergoes non-detected transmission errors does not have excessively serious consequences, provided the repeated transmission of code words representing the same sequence of information symbols cannot lead to repeated reception of erroneous words without detection of an error.

For example, in the field of operation of a vehicle by means of digital control signals, the impossibility of correctly transmitting a certain order is not catastrophic, provided the operator (or the operating system) is informed of this impossibility sufficiently early to take appropriate safety measures (such as resorting to an auxiliary mechanical member controlled by means of a system of electrical components other than that of the principal mechanical member).

According to the invention, when two identical successive messages are transmitted, these two messages are coded in different manner. These two identical messages are therefore represented by two different code words, and the corresponding received words are decoded according to their respective code.

To give a specific example, let us suppose that the code words are all of the same length n>k, and that their k last symbols are systematically taken identical to the k information symbols, the (n−k) first symbols representing the redundancy (this is an example of "systematic" coding). Let us additionally suppose that the "channel noise" has the effect of replacing, with zeros, certain particular components of each code word transmitted by the channel. Under these conditions, if the error concerns the information symbols rather than the redundancy symbols, the received words corresponding to two identical successive messages will be different, since the redundancy symbols were initially different (as a whole) for these two messages. If, in contrast, the error concerns the redundancy symbols rather than the information symbols, the two words received will be similar to one another or perhaps even identical, but the receiver will verify the respective presence of each received word in a code different from the other code.

It is therefore seen that, under these conditions, the situation is very improbable that a first erroneous received word will be found to belong to the first code and, at the same time, a second erroneous received word will be found to belong to the second code. For this reason, by virtue of the invention, the situation becomes very improbable that a non-detected error will occur during the transmission of a first message and at the same time a non-detected error will occur during the transmission of a second message identical to the first.

To an even greater extent, the probability of non-detection of transmission errors affecting two successive messages is also very low when these two messages are different from one another, if the data transmission method according to the invention is being used. As an example, that concerns two messages representing an amplitude or a speed that varies with time during actuation of a vehicle member.

For the applications in question, therefore, the present invention advantageously makes it possible to obtain a very high safety level with an entirely reasonable operating cost. For the reasons explained hereinabove, it is particularly advantageous when the member in question (aileron, brake, and so on) is part of an airplane.

According to particular arrangements, two such successive information symbol blocks are always coded by means of two mutually different codes.

In this way protection is assured for all the messages transmitted along the channel in question.

It will be noted that, to accomplish this, it is sufficient to use m=2 different codes in alternation.

As a variant, there is successively used a number m>2 of different codes, in repetitive manner. As explained in detail hereinafter, such an arrangement makes it possible to reduce considerably the risk of non-detected errors affecting a series of m successive Identical messages, all the more so as m becomes larger.

According to other particular arrangements, the codes used all have the same length n, in order to facilitate sampling of the data.

According to yet other particular arrangements, the codes used are linear codes.

The codes referred to as "linear" are well known in the telecommunications field (a field that a priori is different from that of digital controls). These codes are such that any linear combination of code words (with the coefficients used in the alphabet) is also a code word. These codes may be conveniently associated with a matrix H of dimension (n−k)×n, known as "parity matrix" ("parity-check matrix" in English): a word v of given length n is a code word if and only if it satisfies the relation: $H \cdot v^T = 0$ (where the exponent T Indicates transposition); this code is then said to be "orthogonal" to this matrix H. The presence of (at least) one transmission error in a received word r is therefore easily detected if $H \cdot r^T \neq 0$.

To change the linear code of a message to the following, it is sufficient to chan parity-check matrix H.

According to even more particular arrangements, the codes used are cyclic codes.

The codes referred to as "cyclic" are particular linear codes, which are such that the result of a circular permutation applied to any code word whatsoever is itself also a code word. The cyclic codes are well known for their efficacy and low cost; they are commonly used, and coding/decoding methods using these codes have been integrated into commercially available components (physical or software) (such as those, for example, intended for telecommunications networks).

As explained in detail hereinafter, a "generator polynomial" is attached to each cyclic code. To change the code of a message to the following, it is therefore sufficient to change the generator polynomial.

According to a second aspect, the invention concerns a system for data transmission concerning the actuation of a vehicle member, comprising a coder capable of applying channel coding to information symbol blocks representative of the said data in such a way as to form code words intended to be transmitted along a given channel, the said system being noteworthy in that the said coder is capable of coding two such successive information symbol blocks by means of two mutually different codes.

The advantages offered by this data transmission system are substantially the same as those offered by the data transmission methods described briefly hereinabove. It is particularly advantageous when the said member is part of an airplane.

According to particular arrangements, the said data transmission system additionally comprises an error detection unit that, for each word received at the end of the given channel, is capable of:

determining which channel code has been used to code the information symbols corresponding to this received word, and verifying if this received word indeed belongs to this channel code.

The invention also relates to:

a fixed data storage means containing information-processing program code instructions for execution of the steps of any one of the data transmission methods briefly explained hereinabove, a partly or completely portable data storage means containing information-processing program code instructions for execution of the steps of any one of the data transmission methods briefly explained hereinabove, and a computer program, containing instructions such that, when the said program controls a programmable data processing device, the said instructions ensure that the said data processing device uses any one of the data transmission methods briefly explained hereinabove.

The advantages offered by these data storage means and this computer program are substantially the same as those offered by the data transmission methods briefly explained hereinabove.

BRIEF DESCRIPTION OF THE DRAWINGS

Other aspects and advantages of the invention will become apparent upon reading the detailed description hereinafter of particular embodiments, given by way of non-limitative examples. The description refers to the single FIGURE, which is a block diagram of one embodiment of a data transmission system according to the invention.

BRIEF DESCRIPTION OF THE PREFERRED EMBODIMENTS

The function of the device represented schematically in this FIGURE is to transmit, from a source 10 to a recipient 100, data concerning the actuation of a vehicle member. As an example, these data can represent an order or a partial order for operation of the vehicle. In the first place, source 10 converts these information streams into a sequence of symbols belonging to a certain Galois field GF(q), and transmits these symbols to a storage unit 20, which accumulates the symbols in such a way as to form blocks that each contains k information symbols representing a message.

According to the invention, each of these blocks is transmitted by storage unit 20 to a coder 30, which at this point incorporates the redundancy in such a way as to construct a word belonging to a respective code. For example, it will be possible to provide for allocating a rank to each message within a series of messages and for associating a predetermined code with each message according to its rank.

The code words thus formed are then transmitted to a modulator 40, which associates with each symbol of the code word a modulation symbol. These modulation symbols are then transmitted to a transmitter 50, which inserts the symbols in a transmission channel. This channel may be, for example a hard-wired link, but it may also be a wireless link such as a radio link; it may also be a logical channel.

The transmitted message arrives at a receiver 60, after having been affected by "transmission noise", which may have the effect of modifying or erasing some of the modulation symbols.

Receiver 60 then transmits these symbols to demodulator 70, which transforms them to GF(q) symbols. The symbols resulting from transmission of a same code word are then grouped into a "received word" in an error detection unit 80. According to the invention, this error detection unit 80 verifies whether each received word indeed belongs to the respective code that has been used by coder 30 for this respective message.

For example, if a rank has been allocated to each message within a series of messages, it will be possible to furnish coder 30 and error detection unit 80 with the same correspondence list of the "consultation table" type (in English: "Look Up Table" or L.U.T.), which will permit the two devices to know which code must be associated with a message in accordance with its rank; such a look up table may be conveniently implemented in software form or in the form of a specific logic circuit.

If error detection unit 80 observes that the received word indeed belongs to the code respectively associated with this message, the received word is transmitted to a redundancy suppression unit 90, which extracts therefrom k information symbols, by applying a decoding algorithm that is the inverse of that used by coder 30. Finally, these information symbols are delivered to their recipient 100.

On the other hand, if error detection unit 80 observes that the received word does not belong to the code respectively associated with this message, it trips an alarm according to the particular arrangements that the person skilled in the art will have defined, in known manner, in accordance with the envisioned application of the invention.

It may be considered that units 80 and 90 together form a "decoder" 110.

The data transmission method according to the invention will now be illustrated with the aid of a code family presented by way of practical example. The parameters chosen below do not necessarily correspond to a preferred choice for coding or decoding, since this practical example is provided merely to permit the person skilled in the art to understand the method according to the invention more easily.

Let us consider, for example, coding by cyclic codes all having the same dimension k and the same length n>k.

It is recalled that words belonging to a cyclic code can be conveniently constructed by means of polynomials, for example in the following manner.

There is first chosen a polynomial G(x) of degree (n−k) and divisor of ($x^n$−1), referred to as the "generator polynomial" of the cyclic code.

Let $a=(a_0, a_1, \ldots a_{k-1})$ be a sequence of information symbols to be coded. To begin, there is formed the "polynomial expression"

$$a(x) = \sum_{i=n-k}^{n-1} a_{i-n+k} x^i$$

of this sequence. There is then performed a "Euclidian division" of a(x) by G(x), which is written as:

$a(x)=Q(x)G(x)+R(x),$ where Q(x) denotes the quotient, and where the degree of the remainder R(x) is strictly smaller than (n−k). If $v(x)=a(x)-R(x)$ is then taken as code word, it is seen that all code words obtained in this way are such that their polynomial expression is a multiple of the generator polynomial G(x). In fact, the divisibility by a certain generator polynomial is a characteristic of the polynomial expression of the words belonging to a given cyclic code.

Explicitly, if the remainder is written $$R(x) = \sum_{i=0}^{n-k-1} R_i x^i,$$

then the code word obtained by this algorithm (known as "Euclidian") is written $\underline{v}=(-R_0, \ldots, -R_{n-K-1}, a_0, a_1, \ldots, a_{k-1}).$ As can be seen, k of the components of v obtained in this way are respectively equal to the components of a: the coding here is therefore referred to as "systematic".

The presence of (at least) one transmission error in a received word is then easily detected when the polynomial expression of this received word is not a multiple of the generator polynomial G(x) used to code this message.

According to one embodiment of the invention, there is successively used coding/decoding by cyclic code with m≧2 distinct generator polynomials, in repeated manner:

$G_1(x), G_2(x), \ldots, G_m(x), G_1(x), G_2(x), \ldots, G_m(x), G_1(x), G_2(x), \ldots, G_m(x),$ and so on.

In order to optimize error detection in such an embodiment, it is advisable to apply what we will call the "complementarity principle".

To understand the substance of this principle, let us reconsider an example, mentioned hereinabove, of error distribution that can affect a sequence of identical messages: this is the case in which the channel noise has the effect of replacing the (n−k) prime components (containing the redundancy symbols if the Euclidian algorithm described hereinabove is applied) with zeros in each code word passing through the channel. In this case (obviously specific, but illustrative), the successive received words are identical, it is then desirable that, if this received word accidentally is found to be a word belonging to one of the m codes, it is very improbable that this received word belongs to all of the m codes, so that the presence of a transmission error will very probably be detected at the latest after m received words, and repetition of errors (indicating the possibility of ongoing failure of the channel) will very probably be detected at the latest after 2m received words.

In the embodiment under consideration, it is seen that, if the m generator polynomials used do not contain any common factor, then an erroneous received word, in order to escape detection, will have to have a polynomial expression that is a multiple of all the m generator polynomials, which is obviously very improbable if not impossible. In this way there is therefore obtained a very high safety level, whether or not the digital controls at the origin of the coded messages in question are identical.

In practice, it will be permissible to accept only a relatively small number of common factors for the m generator polynomials. For example, if q=2 (binary alphabet), it will be possible to take $G_i(x)=(1+x) \cdot P_i(x)$, where i=1, ..., m and where the polynomials $P_i(x)$ do not have common factors, because, as is known by the person skilled in the art, the factor (1+x) makes it conveniently possible to detect all the errors affecting an odd number of components of a code word.

In still more particular manner, if n is taken as 15, for example, it will be noted that $$x^{15} - 1 = \prod_{i=0}^{4} M_i(x),$$

where:

$M_0(x)=x+1,$ $M_1(x)=x^4+x+1,$ $M_2(x)=x^4+x^3+1,$ $M_3(x)=x^4+x^3+x^2+x+1,$ and $M_4(x)=x^2+x+1.$ Therefore, for a case such as m=3 and $P_i(x)\equiv M_i(x)$ (i=1, 2, 3), there are obtained three generator polynomials of degree 5, thus making it possible to code successive sequences of k=15−5=10 information symbols in three different ways.

An analogous "complementarity principle" preferably will be applied if another coding method is used, such as coding by non-cyclic linear code by means of parity-check matrices that have the same size (n−k)×n, but that differ in pairs.

The invention claimed is:

1. A method for data transmission concerning the actuation of a vehicle member, the method comprising:
   transmitting along a given channel, code words that each result from channel coding of an information symbol block representative of the data, at least two successive information symbol blocks are coded with two mutually different codes of the same length.

2. The method for data transmission according to claim 1, wherein the two successive information symbol blocks are always coded with two mutually different codes.

3. The method for data transmission according to claim 2, wherein there are used two different codes in alternation.

4. The method for data transmission according to claim 2, wherein there is successively used more than two different codes, in repetitive manner.

5. The method for data transmission according to claim 1, wherein the codes are linear codes.

6. The method for data transmission according to claim 5, wherein the codes are cyclic codes.

7. The method for data transmission according to claim 1, wherein the member is part of an airplane.

8. A fixed data storage means containing information-processing program code instructions for execution of the steps of the data transmission method according to claim 1.

9. A partly or completely portable data storage means, containing information-processing program code instructions for execution of the steps of the data transmission method according to claim 1.

10. A non-transitory computer readable storage medium encoded with instructions executed by a processor in a programmable data processing device, and the instructions ensure that the data processing device uses a data transmission method according to claim 1.

11. A system for data transmission concerning the actuation of a vehicle member, comprising:
    a coder configured to apply channel coding to information symbol blocks representative of the data to form code words to be transmitted along a given channel, wherein the coder is configured to code two successive information symbol blocks with two mutually different codes of the same length.

12. The system for data transmission according to claim 11, further comprising:
    an error detection unit that, for each word received at an end of a given channel, is configured to:
    determine which channel code has been used to code the information symbols corresponding to this received word, and
    verify if this received word indeed belongs to this channel code.

13. The system for data transmission according to claim 11, wherein the member is part of an airplane.

* * * * *